(12) United States Patent
Karivaradaswamy et al.

(10) Patent No.: US 10,372,947 B2
(45) Date of Patent: Aug. 6, 2019

(54) PARSING, PROCESSING, AND/OR SECURING STREAM BUFFERS

(71) Applicant: Microsoft Technology Licensing, LLC, Redmond, WA (US)

(72) Inventors: Sathyanarayanan Karivaradaswamy, Sammamish, WA (US); Naveen Thumpudi, Redmond, WA (US); Suhib F M Alsisan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 305 days.

(21) Appl. No.: 15/368,394

(22) Filed: Dec. 2, 2016

(65) Prior Publication Data

US 2018/0157868 A1 Jun. 7, 2018

(51) Int. Cl.
*G06F 13/16* (2006.01)
*G06F 21/78* (2013.01)

(52) U.S. Cl.
CPC .......... *G06F 21/78* (2013.01); *G06F 13/1673* (2013.01)

(58) Field of Classification Search
CPC ...... G06F 13/1673; G06F 21/10; G06F 21/60; G06F 21/606; G06F 21/78; G06F 21/79
See application file for complete search history.

(56) References Cited

U.S. PATENT DOCUMENTS

| | | | |
|---|---|---|---|
| 6,697,944 B1 | 2/2004 | Jones et al. | |
| 7,506,082 B2 | 3/2009 | Kim | |
| 7,886,353 B2 | 2/2011 | Avraham et al. | |
| 8,528,096 B2 | 9/2013 | Fruhauf et al. | |
| 2004/0060060 A1* | 3/2004 | Carr | G06F 21/10 725/31 |
| 2005/0015611 A1 | 1/2005 | Poisner | |
| 2005/0097338 A1 | 5/2005 | Lee | |
| 2005/0097341 A1* | 5/2005 | Francis | G06F 21/10 713/189 |
| 2008/0040805 A1* | 2/2008 | Yasue | G06F 21/31 726/26 |

(Continued)

OTHER PUBLICATIONS

"Enhancing USB 3.0 Cameras Reliability with Frame Buffer", In Point Grey White Paper Series, May 4, 2015, 4 pages.

(Continued)

*Primary Examiner* — Glenn A. Auve
(74) *Attorney, Agent, or Firm* — Arent Fox LLP

(57) ABSTRACT

Described are examples for securely storing stream data received from a stream source. Stream data can be received from the stream source for storing in one or more secured buffers of a secure memory, wherein the stream data includes a header portion generated by a driver for the stream source and a payload portion generated from the stream source. The payload portion of the stream data can be stored in the one or more secured buffers and contiguous to a previous payload portion of previous stream data received from the stream source. The header portion of the stream data can be stored in another portion of the secure memory or a non-secure memory. A data frame, from the one or more secured buffers, comprising at least the payload portion of the stream data and the previous payload portion of the previous stream data can be provided to an application.

20 Claims, 8 Drawing Sheets

(56) References Cited

U.S. PATENT DOCUMENTS

| | | | |
|---|---|---|---|
| 2008/0147964 A1 | 6/2008 | Chow et al. | |
| 2008/0163368 A1* | 7/2008 | Harris | G06F 21/79 726/21 |
| 2009/0254986 A1* | 10/2009 | Harris | G06F 21/74 726/17 |
| 2009/0313397 A1 | 12/2009 | England et al. | |
| 2014/0095890 A1* | 4/2014 | Mangalore | G06F 21/10 713/189 |
| 2016/0234178 A1* | 8/2016 | Jenkins | H04L 63/0457 |
| 2018/0150414 A1* | 5/2018 | Wilson | G06F 12/1458 |
| 2018/0288197 A1* | 10/2018 | Izenberg | H04L 47/2433 |

OTHER PUBLICATIONS

Vijayakumar, et al., "Integrating Usb in Image Sensing Applications", http://www.cypress.com/file/109241/download, Published on: Aug. 2011, 1-5 pages.

Kuntze, et al., "Secure Deployment of Smart Grid Equipment", In Power and Energy Society General Meeting, Jul. 21, 2013, pp. 1-5.

Verma, et al., "Data Theft Prevention and Endpoint Protection from PnP Devices", In Proceedings of National Conference on Communication Technologies & its impact on Next Generation Computing, Oct. 20, 2012, pp. 25-27.

"Cyclic Redundancy Checks in Usb", In USB Whitepaper, Apr. 26, 2015, pp. 1-6.

\* cited by examiner

PARSING, PROCESSING, AND/OR SECURING STREAM BUFFERS

BACKGROUND

Many computing devices employ input devices that produce output streams for consumption by applications operating on the computing device. These input devices can include sensor devices (e.g., cameras, biometric devices) that obtain and output data in streams including one or more data frames, where a plurality of data frames can be output in frames according to a cadence. The streams are typically stored in memory and accessed by an operating system or one or more applications for analyzing and/or outputting data captured from the streams. In one example, a computing device may include a camera to facilitate capturing video for storing as a movie, performing video conferencing with a remote computing device, etc. In addition, the camera may be used for face authenticating a user to utilize one or more applications or other functions of the computing device based on comparing an image (or stream of images) captured by the camera to one or more other stored images according to a face recognition/authentication function. Similarly, for example, the computing device may include a fingerprint sensor to facilitate capturing fingerprint images for authenticating a user to utilize one or more applications or other functions of the computing device.

The input devices may be integral to the computing device or may be external to the computing device. In either case, the input devices may be coupled with the computing device via a wired or wireless interface, such as universal serial bus (USB), Firewire, Bluetooth, or any other type interface that may define a communication interface. The communication interface may introduce additional data into the data received from the input device, such as one or more headers for verifying integrity of the data. In a specific example, an input device may include a USB camera, and the USB interface may attach headers to data received from the USB camera to allow for verifying integrity of the data. An operating system of the computing device may include a driver for the USB camera, such as a USB video class (UVC) driver, which can verify the integrity of received stream data based on the header, remove the header from the stream data payload, and generate a data frame from one or more instances of received stream data payloads for providing to one or more applications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a method for securely storing a payload of stream data received from a stream source is provided. The method includes receiving stream data from the stream source for storing in one or more secured buffers of a secure memory, wherein the stream data includes a header portion generated by a driver for the stream source and a payload portion generated from the stream source. The method also includes storing the payload portion of the stream data in the one or more secured buffers and contiguous to a previous payload portion of previous stream data received from the stream source, and storing the header portion of the stream data in another portion of the secure memory or a non-secure memory. Further, the method includes providing, to an application, a data frame, from the one or more secured buffers, comprising at least the payload portion of the stream data and the previous payload portion of the previous stream data.

In another example, a device for securely storing a payload of stream data received from a stream source is provided. The device includes a memory storing one or more parameters or instructions for executing a driver that interfaces with the stream source, and at least one processor coupled to the memory. The at least one processor is configured to receive stream data from the stream source for storing in one or more secured buffers of a secure memory, wherein the stream data includes a header portion generated by the driver for the stream source and a payload portion generated from the stream source. The at least one processor is also configured to store the payload portion of the stream data in the one or more secured buffers and contiguous to a previous payload portion of previous stream data received from the stream source, and store the header portion of the stream data in another portion of the secure memory or a non-secure memory. The at least one processor is also configured to provide, to an application, a data frame, from the one or more secured buffers, comprising at least the payload portion of the stream data and the previous payload portion of the previous stream data.

In another example, a computer-readable medium, including code executable by one or more processors for securely storing a payload of stream data received from a stream source is provided. The code includes code for receiving stream data from the stream source for storing in one or more secured buffers of a secure memory, wherein the stream data includes a header portion generated by a driver for the stream source and a payload portion generated from the stream source. The code also includes code for storing the payload portion of the stream data in the one or more secured buffers and contiguous to a previous payload portion of previous stream data received from the stream source, and code for storing the header portion of the stream data in another portion of the secure memory or a non-secure memory. The code also includes code for providing, to an application, a data frame, from the one or more secured buffers, comprising at least the payload portion of the stream data and the previous payload portion of the previous stream data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
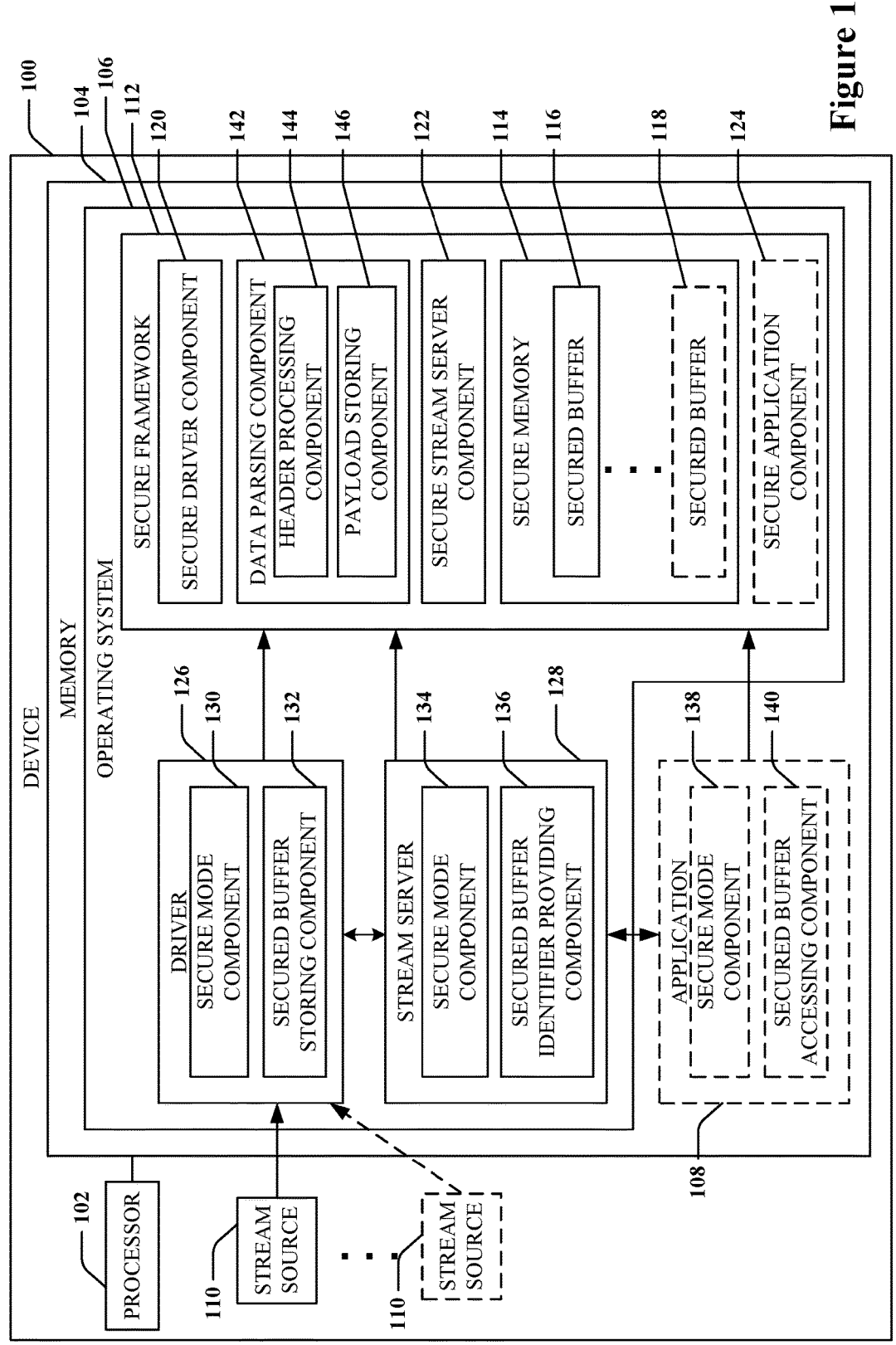
FIG. 1 is a schematic diagram of an example of a device for securing stream data from a stream source.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to securing stream data from one or more stream sources to facilitate storing and retrieving stream data in a secure memory. This can prevent tampering with the stream data, e.g., by a playback or middleman attack, where data in a stream may otherwise be altered in the pipeline between the device outputting the stream data and the application or operating system consuming the stream data. For example, a driver that provides the stream data (e.g., as captured from a stream source) can be provided with a secured buffer identifier for storing the stream data in a secured buffer in secure memory. For instance, the driver, operating in a kernel mode, can provide the data with the secured buffer identifier to a secure framework for storing the data in the secured buffer. Where the stream source employs a communication interface that adds data, such as a header, to the stream data, the additional data can be removed within the secure framework to facilitate generating a data frame from payloads of multiple instances of received stream data.

In one example, a secured buffer can be allocated in the secure framework for storing multiple instances of stream data corresponding to a data frame (e.g., having a size to accommodate the multiple instances of the stream data and related additional data from the communication interface). When the stream data in the secured buffer includes a start of frame and an end of frame for a data frame, the stream data can be copied from the secured buffer to a second secured buffer, where the copying process may include validating a header associated with each payload of stream data, and/or contiguously storing the payloads from the stream data in the second secured buffer (e.g., without the header) to generate a data frame of stream data received from the stream source. In one example, the headers from the instances of stream data can be stored in a separate secured or non-secured buffer. In either case, an application can access the second secured buffer via the secure framework to obtain the data frame.

In another example, a memory descriptor list can be generated in the secure framework and provided to a driver of the stream source for storing stream data from the stream source in the secure memory. For example, the memory descriptor list can include a plurality of header portion memory locations and a plurality of payload portion memory locations for respectively storing header portions of stream data and corresponding payload portions of the stream data. For example, the memory descriptor list can include a location of a header portion, followed by a pointer to a location of a corresponding payload portion, the location of the payload portion can be followed by a pointer to a location of a next header portion, etc. In this example, the memory descriptor list can be provided to the driver, and the driver can store the headers and corresponding payload portions of stream data in the memory locations specified in the memory descriptor list. In an example, at least the payload portion memory locations can be contiguous in memory to facilitate generating a data frame. When the contiguous payload portion memory locations include a start of frame and end of frame indicator, the data frame can be provided to one or more applications.

In either example, a manufacturer of the stream source can provide a secure mode for storing stream data without including functionality in a driver for processing and parsing the stream data from the interface of the stream source.

Figure 2:
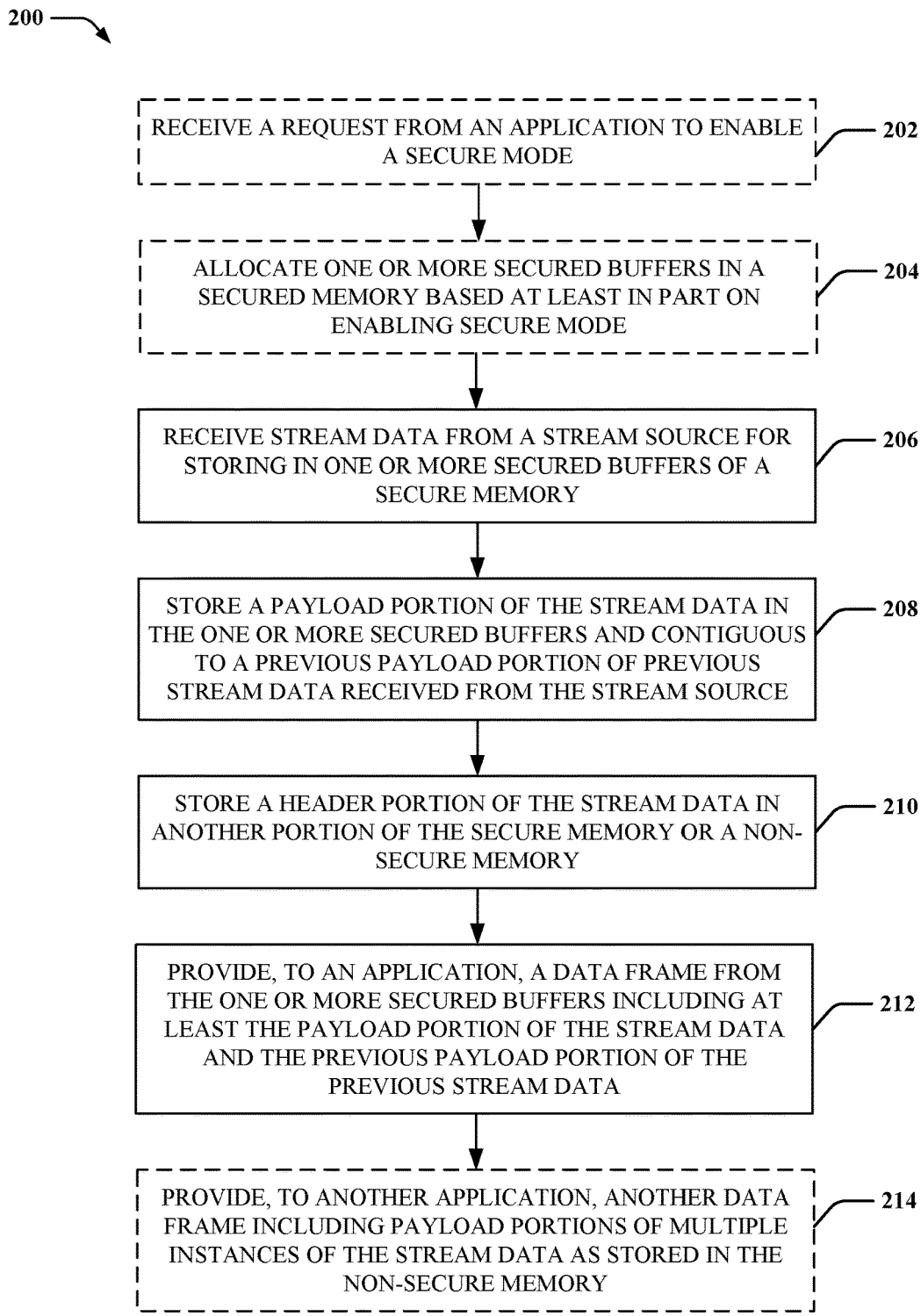
FIG. 2 is a flow diagram of an example of a method for securing stream data from a stream source.
Figure 3:
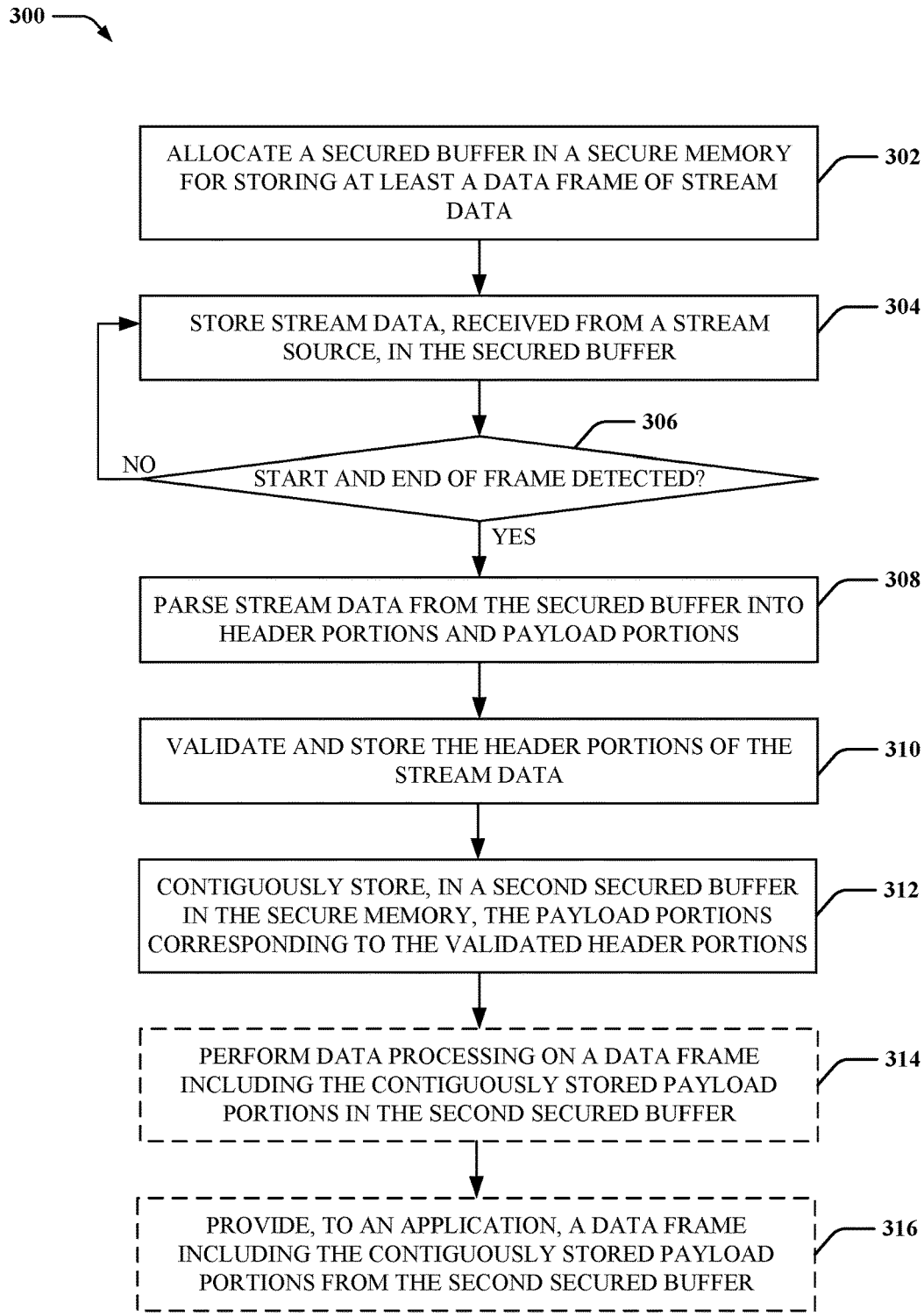
FIG. 3 is a flow diagram of an example of a method for parsing stream data into header portions and payload portions for contiguously storing the payload portions.
Figure 4:
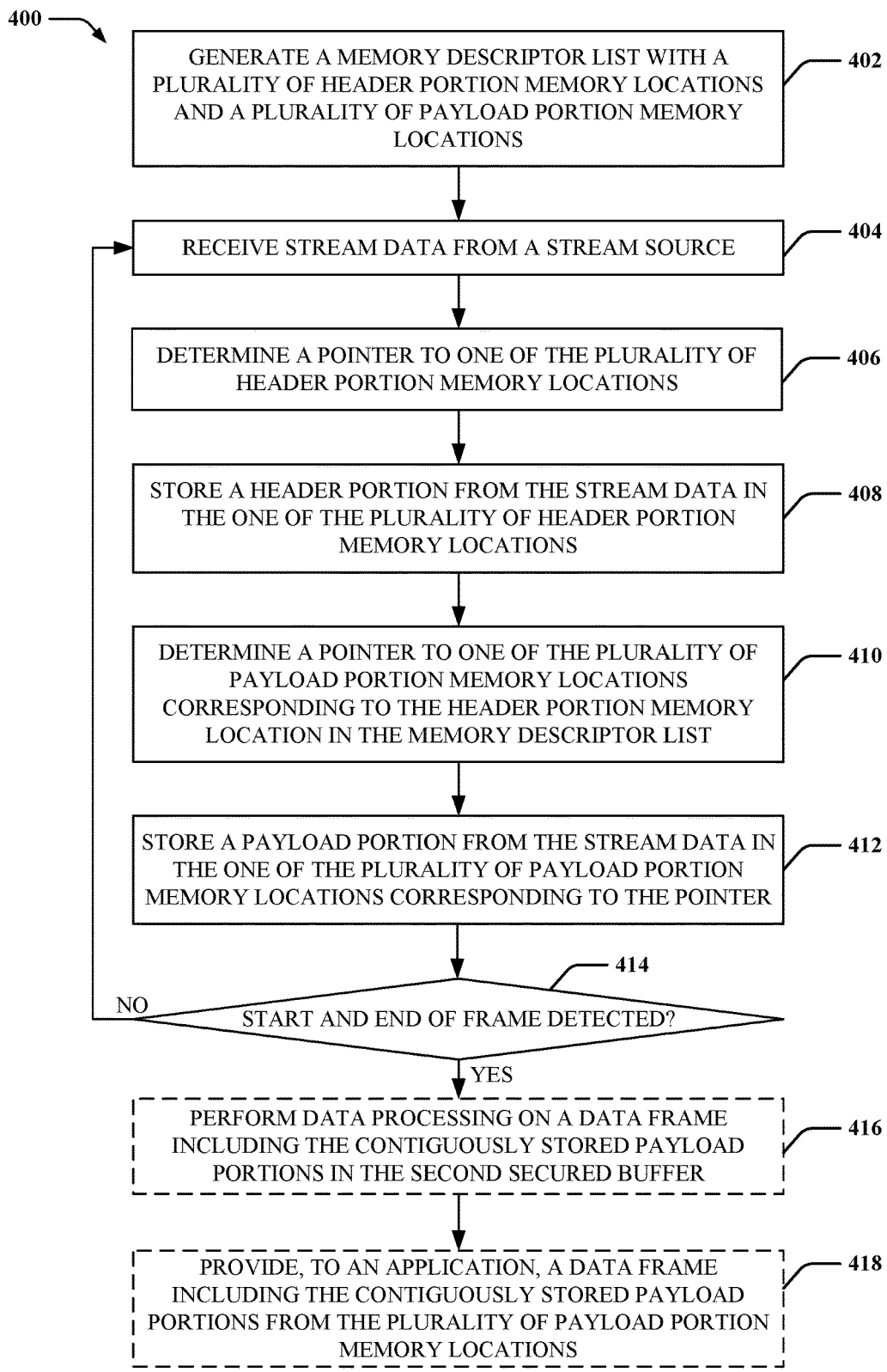
FIG. 4 is a flow diagram of an example of a method for storing stream data based on a memory descriptor list.

Turning now to FIGS. 1-7, examples are depicted with reference to one or more components and one or more methods that may perform the actions or operations described herein, where components and/or actions/operations in dashed line may be optional. Although the operations described below in FIGS. 2-4 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a device 100 (e.g., a computing device) that can secure stream data received from one or more stream sources. In an example, device 100 can include a processor 102 and/or memory 104 configured to execute or store instructions or other parameters related to providing an operating system 106, which can execute one or more applications, such as optional application 108. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component), and/or the like. Memory 104 may store instructions, parameters, data structures, etc., for use/execution by processor 102 to perform functions described herein. Device 100 can also include one or more stream sources 110 for obtaining input (e.g., video input, audio input, biometric input or other input that can be obtained in frames of data, etc.) and outputting a corresponding data stream. For example, the one or more stream sources 110 may include one or more sensor devices, which may be video cameras, still image cameras, (e.g., a RGB camera, IR camera, depth camera), etc., an eye scan or eye tracking sensor, a fingerprint or touch sensor, a microphone, etc. The stream source(s) 110 may be internal or external to the device 100, and may be communicatively coupled to the computing device via substantially any wired or wireless interface (e.g., universal serial bus (USB), Firewire, local area network (LAN), wireless LAN (WLAN), Bluetooth, radio frequency identification (RFID), near field communication (NFC), or any other communication interface).

In an example, operating system 106 can provide a secure framework 112 having a secure memory 114 for storing one or more secured buffers 116, 118. For example, the secure framework 112 can store data in the secured buffers 116, 118 using an encryption algorithm and/or associated encryption keys that may be known by the secure framework 112 and not exposed outside of the secure framework 112. Accordingly, the secure framework 112, e.g., via one or more components (such as, but not limited to, a secure driver component 120, a secure stream server component 122, a secure application component 124, and/or a data parsing component 142, as will be described below), can manage storage and retrieval of data in the secured buffers 116, 118 based on requests from the components (such as secure driver component 120, secure stream server component 122, secure application component 124, data parsing component 142 in a secure environment (e.g., using the encryption algorithm and/or associated encryption keys to store data upon request and/or using a corresponding decryption algorithm and/or associated decryption keys to retrieve data upon request). In one example, the secure framework 112 may assign secured buffer identifiers to the secured buffers 116, 118 for indicating to the components 120, 122, 124, 142 when storing the data, and for allowing the components 120, 122, 124, 142 to specify the secured buffer identifiers when requesting corresponding data. For example, the secure framework 112 may generate one or more of the secured buffer identifiers as a globally unique identifier (GUID).

As described, the secure framework 112 may include one or more components to facilitate securely storing/retrieving data in the secure memory 114. These components may include, but are not limited to, a secure driver component 120 for communicating with a driver 126 of the operating system 106, a secure stream server component 122 for communicating with a stream server 128 provided by the operating system 106, a secure application component 124 for communicating with an application 108 executing on the device 100, and/or a data parsing component 142 for parsing data in the secure memory 114 into one or more portions.

For example, application 108 can execute within (e.g., as a service) or on top of the operating system 106. In order to access to the secure framework 112, application 108 utilize such secure components 120, 122, 124, 142, and there may be additional secure components in the secure framework 112 (e.g., for other drivers and/or services/applications executing on operating system 106).

In addition, for example, secure framework 112 may provide the components 120, 122, 124, 142 for exclusive use by the driver 126, stream server 128, and/or application 108. Moreover, in an example, secure framework 112 may facilitate establishing a trust relationship with the driver 126, stream server 128, application 108, etc. (e.g., by allowing specification of credentials, a unique identifier, or via other verification mechanisms).

In an example, driver 126 can execute on the operating system 106 for providing stream data from stream source 110 to the operating system 106 and/or one or more components thereof, such as stream server 128 for providing the stream data (e.g., as modified, aggregated/correlated with stream data from other devices, or otherwise) to one or more applications 108 or other services/components of the operating system 106. Driver 126 can include a secure mode component 130 for activating a secure mode at the driver 126, and a secured buffer storing component 132 for storing stream data from stream source 110 in a secured buffer 116, 118 via secure framework 112 when the secure mode is activated. Driver 126 may add certain data to the stream data received from stream source 110, such as one or more headers. As such, secure framework 112 may also include a data parsing component 142 for processing, removing, etc., data added by the driver 126 to the stream data. For example, data parsing component 142 may include a header processing component 144 for determining and processing a header of the data received from driver 126, and/or a payload storing component 146 for storing a payload portion of the stream data (e.g., without or separate from the header).

In addition, in an example, stream server 128 can execute via the operating system 106 (e.g., as a service) to obtain stream data from the stream source 110 (e.g., via the secure framework 112). Stream server 128, in an example, may modify, aggregate, correlate, etc. data from one or more stream sources for providing to one or more applications. For example, stream server 128 can output data from multiple stream sources 110 in one or more output streams that include one or more data frames output according to a cadence (e.g., video frames from a camera at a frames per second cadence, and/or at a defined frame resolution). Stream server 128, for example, may also include a secure mode component 134 for activating a secure mode at the stream server 128, and a secured buffer identifier providing component 136 for obtaining and providing one or more secured buffer identifiers to driver 126, one or more applications 108, operating system 106, etc. for storing and/or retrieving stream data to/from one or more secured buffers 116, 118 via secure framework 112.

Additionally, application 108 may include an application leveraging one or more functions of the operating system 106 for executing thereon and/or may be one or more services provided by operating system 106. In an example, application 108 may include a secure mode component 138 for activating a secure mode at the application 108, and a secured buffer accessing component 140 for accessing one or more secured buffers 116, 118 to obtain secured stream data. In one example, stream server 128 can operate in a non-secure mode. In the non-secure mode, stream server 128 can receive stream data from the driver 126, and store the stream data in a non-secure memory for accessing by application 108. In another example, as described further below, stream server 128 can activate a secure mode for secure handling of stream data from the driver 126. In the secure mode, stream server 128 can provide one or more secured buffer identifiers to the driver 126 for storing stream data and/or one or more secured buffer identifiers of parsed stream data to the application 108. Driver 126, for example, can accordingly store stream data in one or more secured buffers 116, 118 based on the one or more secured buffer identifiers, data parsing component 142 can parse the stream data for storing into other secured buffers 116, 118 corresponding to other secured buffer identifiers, and application 108 can access the stream data in the one or more secured buffers 116, 118 based on the one or more other secured buffer identifiers. Storing and accessing data in the secure framework 112 via components 120, 124 in this regard can prevent playback or middleman attacks where stream data could otherwise be overridden or otherwise compromised in a non-secure framework.

FIG. 2 is a flowchart of an example of a method 200 for storing stream data in one or more secured buffers of a secure memory. For example, method 200 can be performed by a device 100 and/or one or more components thereof to facilitate securely storing the stream data.

In method 200, optionally at action 202, a request to enable a secure mode can be received from an application. In an example, secure mode component 134, e.g., in conjunction with processor 102, memory 104, operating system 106, etc., can receive the request from the application 108 to enable the secure mode, and can accordingly enable the secure mode (e.g., at stream server 128) for storing, in the secured buffer (e.g., secured buffer 116, 118), stream data captured from the stream source (e.g., stream source 110). In one example, application 108, via secure mode component 138, may request operation in a secure mode such that data from stream source 110 is stored in the secure framework, where the secure mode component 138 may provide the request to stream server 128 (e.g., via an interface). In an example, stream server 128 can activate the secure mode to facilitate storage and retrieval of stream data from stream source 110 via secure framework 112. In one example, secure mode component 134 may initialize the secure framework 112 (e.g., based on querying the operating system 106 to determine whether the secure framework 112 is available). In one example, secure mode component 134 can enable the secure mode for a period of time (which may be configured or otherwise specified in the request), until a request to exit the secure mode is received, etc. In addition, stream server 128 can request driver 126 to enable a secure mode for securely storing the stream data, and secure mode component 130 can accordingly enable secure mode at the driver 126.

As described, for example, stream server 128 may also operate in a non-secure mode to receive and store stream data from the stream source 110 in non-secure memory, and can allow the application 108 to obtain the stream data from the non-secure memory. In one example, stream server 128 may operate in the secure mode and the non-secure mode for different applications (e.g., concurrently and/or serially). For example, stream server 128 may facilitate contemporaneous storage of the stream data from stream source 110 in separate non-secure and secure memory locations for non-secure and secure consumption by the different applications.

In method 200, optionally at action 204, one or more secured buffers can be allocated in a secure memory based at least in part enabling secure mode. In an example, secure mode component 134, e.g., in conjunction with processor 102, memory 104, operating system 106, etc., can allocate, based at least in part on enabling the secure mode, the one or more secured buffers (e.g., secured buffer 116, 118, etc.) in the secure memory (e.g., secure memory 114 of secure framework 112). In an example, secure mode component 134 can communicate with the secure framework 112 via secure stream server component 122 to allocate the one or more secured buffers 116, 118. For example, secure mode component 134, e.g., based on activating the secure mode, can request allocation of one or more secured buffers 116, 118 from secure framework 112 via secure stream server component 122. In an example, secure framework 112 can accordingly allocate one or more secured buffers 116, 118 in secure memory 114 and can provide an indication of the allocation back to the stream server 128. For example, secure mode component 134 can request allocation of one or more secured buffers 116, 118 to be of a size to accommodate at least one data frame from stream source 110 along with additional information that may be added by the driver 126 (e.g., headers for each instance of stream data forming the data frame). In any case, in one example, secure framework 112, e.g., via secure stream server component 122, can indicate one or more secured buffer identifiers corresponding to the allocated secured buffer(s) 116, 118 to stream server 128.

In method 200, at action 206, stream data can be received from a stream source for storing in one or more secured buffers of a secure memory. In an example, driver 126, e.g., in conjunction with processor 102, memory 104, operating system 106, etc., can receive the stream data from the stream source for storing in the one or more secured buffers of the secured memory. For example, the driver can receive the stream data as one or more data frames or portions thereof. In one example, driver 126 can add data to the stream data, such as one or more headers for validating the received stream data. For example, the driver 126 can be a driver related to an interface of the stream source 110, such as a USB driver, and can add one or more headers to payloads of the stream data, which may be reduced to a payload size corresponding to the interface. Thus, for example, driver 126 may break a data frame from stream source 110 into multiple instances of stream data, which can each include a payload portion of the data frame and a header portion.

Figure 5:
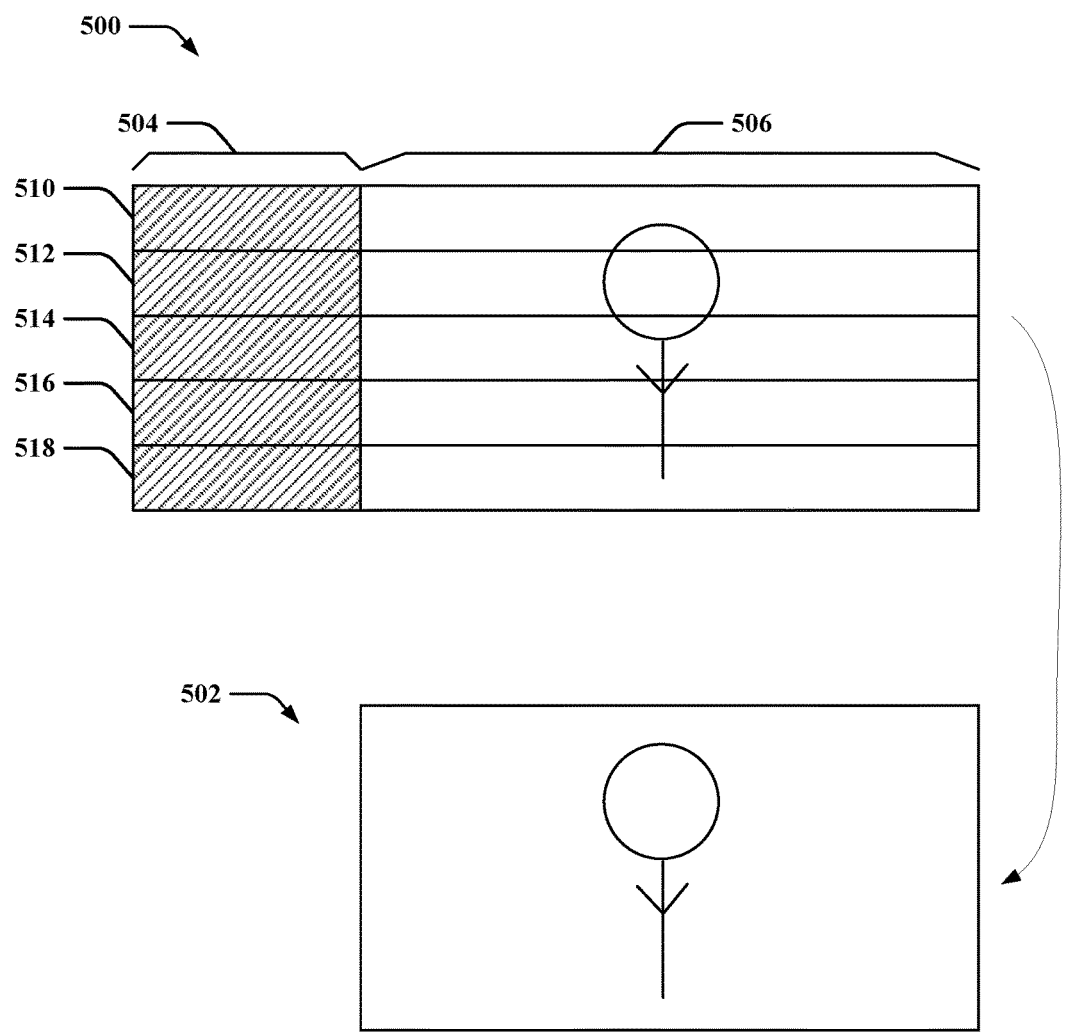
FIG. 5 is a diagram of an example of multiple instances of stream data, corresponding to an image stream.

An example is illustrated in FIG. 5. FIG. 5 includes an example of multiple instances 500 of stream data, corresponding to an image stream, received from a driver 126. In this example, the multiple instances 500 of stream data can include stream data instances 510, 512, 514, 516, 518, which each have a header portion 504 and a payload portion 506. The payload portions 506 can include the stream data as received from a stream source 110, and the driver 126 can insert or append the header portion 504 to payload portions that can be sized based on an interface of the stream source 110 and/or as related to the driver 126. For example, USB can specify a size for certain stream data, which may be less than the size of a complete data frame from the stream source 110. Thus, for example, driver 126 can break the data frame into multiple instances 510, 512, 514, 516, 518 of stream data, and can add a header to each instance, where the header can include information regarding the instance of stream data. In one example, the header portion 504 can be used to validate the integrity of the payload portion 506 for a given instance. For example, the header portion 504 may include a checksum or other verification mechanism that can be used to validate the payload portion 506. As described further herein, the payload portions 506 of each instance 510, 512, 514, 516, 518 can be contiguously stored without (or separate from) the header portions 504 to generate a data frame 502.

In method 200, at action 208, a payload portion of the stream data can be stored in one or more secured buffers and contiguous to a previous payload portion of previous stream data received from the stream source. In an example, secured buffer storing component 132, e.g., in conjunction with processor 102, memory 104, operating system 106, etc., can store the payload portion of the stream data in the one or more secured buffers (e.g., secured buffers 116, 118) and contiguous to a previous payload portion of previous stream data received from the stream source. As described, for example, the payload portion of the stream data can be a portion of a data frame, and thus can be stored contiguously with previous stream data to form the data frame. As shown in FIG. 5, for example, the payload portion may correspond to a payload portion of instance 512, and the previous payload portion can correspond to instance 510. Thus, secured buffer storing component 132 can store the payload portion of instance 512 contiguous with, or otherwise adjacent to, appended to, etc., the previous payload portion of instance 510 in generating the data frame 502. In an example, secured buffer storing component 132 can store the payload portions in the secured buffers 116, 118 via data parsing component 142. For example, secured buffer storing component 132 can provide the payload portion to data parsing component 142, and payload storing component 146 can store the payload portions in the contiguous memory locations in the one or more secured buffers 116, 118 within secure framework 112.

As described further herein, in a specific example, secured buffer storing component 132 can securely store at least the payload portions 506 using various mechanisms. In one example, when a complete data frame is detected in the secured buffers 116, 118, etc., a copy command can be initiated to contiguously store the payload portions 506 in a different secured buffer 116, 118. In another example, a memory descriptor list can be provided to the driver 126 for separately storing the header portions 504 and payload portions 506 in different portions of secured buffers 116, 118 in secure memory 114 and/or non-secured buffers in non-secure memory. In either case, the payload portions 506 can be contiguously stored and separated from the header portions 504 to generate data frames corresponding to the data from stream source 110. Moreover, in one example, secured buffer storing component 132 can provide the stream data to data parsing component 142 for storing the payload portion, and header processing component 144 can validate the payload portions 506 based on the corresponding header portions 504. In this example, payload storing component 146 can store the payload portions having verified header portions.

In method 200, at action 210, a header portion of the stream data can be stored in another portion of the secure memory or a non-secure memory. In an example, driver 126, e.g., in conjunction with processor 102, memory 104, operating system 106, etc., can store the header portion of the stream data in another portion of the secure memory 114 or a non-secure memory (e.g., in a portion of memory 104). For example, driver 126 can initiate a copy command to copy the header portions 504 in a secure or non-secure memory buffer (and/or contiguously or non-contiguously), which can be separate from the payload portions 506. In another example, where secured buffer storing component 132 verifies the header portions 504 of the given instances 510, 512, 514, 516, 518, and/or stores the payload portions 506, secured buffer storing component 132 can flush the header portions 504 from memory, copy the headers or related information to a log file, etc. In one example, stream server 128 can store metadata from the header in a metadata buffer of contiguously stored metadata, which may be stored in non-secure memory.

In method 200, at action 212, a data frame from the one or more secured buffers can be provided to an application including at least the payload portion of the stream data and the previous payload portion of the stream data. In an example, secured buffer accessing component 140, e.g., in conjunction with processor 102, memory 104, operating system 106, etc., can provide, to the application 108, the data frame from the one or more secured buffers including at least the payload portion of the stream data and the previous payload portion of the stream data. For example, secured buffer accessing component 140 may provide the data frame to the application 108 based at least in part on driver 126 providing a secured buffer identifier to the stream server 128, which can correspond to a secured buffer 116, 118 within which payload storing component 146 stores contiguous payload portions of stream data received from the stream source 110. In this example, stream server 128 can provide the secured buffer identifier to the application 108. In another example, secured buffer accessing component 140 may provide the data frame to the application 108 based at least in part on driver 126 at least one of detecting a start of frame and end of frame indicator in multiple instances of stream data, etc., providing an indication of a complete data frame in the secured buffer 116, 118, and/or accordingly contiguously storing the stream data in a secured buffer 116, 118. Moreover, in an example, driver 126 can flush the one or more secured buffers 116, 118 after the data frame is provided to the application 108.

In method 200, optionally at action 214, another data frame including payload portions of multiple instances of the stream data as stored in the non-secure memory can be provided to another application. In an example, driver 126 or stream server 128, e.g., in conjunction with processor 102, memory 104, operating system 106, etc., can provide, to another application, another data frame including payload portions of multiple instances of the stream data as stored in the non-secure memory. For example, driver 126 can concurrently store the instances of stream data in secure and non-secure memory for different applications requesting different levels of security, and the applications 108 can accordingly access the stream data from the secure or non-secure memory. In an example, driver 126 can similarly store the instances of stream data without the headers in the non-secure memory for consumption by the other application.

In an example, providing the data frame to the application, as opposed to each instance of the stream data when received, can provide efficiency in lessening the number of calls between the application 108 and the secure framework 112. Additionally, by providing the functionality to generate the data frame in the data parsing component 142 within secure framework 112, the driver 126 can simply provide the stream data as received to the secure framework 112, and the data parsing component 142 and/or other components of the secure framework 112 can parse, validate, etc. the data as received from the driver 126 for providing to the application 108.

FIG. 3 is a flowchart of an example of a method 300 for storing stream data in one or more secured buffers of a secure memory. For example, method 300 can be performed by a device 100 and/or one or more components thereof to facilitate securely storing the stream data.

In method 300, at action 302, a secured buffer can be allocated in a secure memory for storing at least a data frame of stream data. In an example, secure mode component 134, e.g., in conjunction with processor 102, memory 104, operating system 106, etc., can allocate the secured buffer 116, 118 in the secure memory 114 for storing at least the data frame of stream data via secure stream server component 122. For example, secure mode component 134 can communicate with secure stream server component 122 in the secure framework 112 to allocate secured buffer(s) 116, 118 in secure memory 114. In an example, secure mode component 134 may allocate the secured buffer 116, 118 based at least in part on application 108 requesting enabling of a secure mode, as described. Moreover, for example, secure mode component 134 may allocate the secured buffer 116, 118 to be of a size to store a data frame of stream data along with one or more header portions. In an example, secure mode component 134 can determine the number of header portions to be used for a data frame of stream data based on a size of a data frame of stream data and a size of stream data provided by driver 126. Secure mode component 134 can accordingly allocate the secured buffer 116, 118 to be at least of the size to store the number of header portions and a data frame of stream data.

In method 300, at action 304, stream data, received from a stream source, can be stored in the secured buffer. In an example, secured buffer storing component 132, e.g., in conjunction with processor 102, memory 104, operating system 106, etc., can store stream data, received from a stream source, in the secured buffer 116, 118. For example, secured buffer identifier providing component 136 can provide an identifier of the secured buffer 116, 118 to driver 126, and secured buffer storing component 132 can accordingly store stream data received from the stream source 110 in the secured buffer 116, 118. As described, each instance of stream data can include a header corresponding to an interface of the stream source 110 (e.g., a USB header). An example is shown in FIG. 5, in the multiple instance 500 of stream data, as described.

In method 300, at action 306, it can be determined whether a start of frame indicator and/or an end of frame indicator are detected in the secured buffer. In an example, secured buffer storing component 132, e.g., in conjunction with processor 102, memory 104, operating system 106, etc., can determine whether a start of frame indicator and/or an end of frame indicator are detected in the secured buffer 116, 118. For example, the start of frame indicator and end of frame indicator can be bits or character sequences in received stream data that respectively indicate the start of a data frame or the end of the data frame. In another example, the end of frame indicator may be implicit when beginning of a next frame is detected. If the start of frame or end of frame is not detected, method 300 can continue to action 304 for storing, in the secured buffer, additional stream data received from the stream source until start and end of frame indicators are detected.

Based on detecting start of frame and/or end of frame indicators in the stream data, method 300 can include, at action 308, parsing stream data from the secured buffer into header portions and payload portions. In an example, data parsing component 142, e.g., in conjunction with processor 102, memory 104, operating system 106, etc., can parse the stream data from the secured buffer 116, 118 into header portions and payload portions. In one example, data parsing component 142 may receive a copy command from the secured buffer storing component 132 based on detecting the start of frame and end of frame indicators in the stored stream data. In any case, data parsing component 142 can parse the stream data, e.g., as shown in FIG. 5 in one specific example, into header portions 504 and payload portions 506 at least in part by determining where the header portions 504 end and the payload portions 506 begin in the secured buffer 116, 118.

Method 300 can also include, at action 310, validating and storing the header portions of the stream data. In an example, header processing component 144, e.g., in conjunction with processor 102, memory 104, operating system 106, etc., can validate and store the header portions (e.g., header portions 504) of the stream data. For example, header processing component 144 can validate a checksum in the header portion 504 against a corresponding payload portion of the stream data to ensure the instance of stream data is/was properly received and stored in the secured buffer 116, 118. In an example, header processing component 144 can store the header portions (e.g., of the verified stream data) in a secured buffer 116, 118 and/or a non-secured buffer in non-secure memory. For example, header processing component 144 may store the header portions contiguously or non-contiguously over the secure or non-secured buffers for subsequent processing (if desired) by one or more applications.

Method 300 can also include, at action 312, contiguously storing, in a second secured buffer in the secure memory, the payload portions corresponding to the validated header portions. In an example, payload storing component 146, e.g., in conjunction with processor 102, memory 104, operating system 106, etc., can contiguously store, in the second secured buffer (e.g., secured buffer 116, 118) in the secure memory 114, the payload portions (e.g., payload portions 506) corresponding to the validated header portions. In an example, secure mode component 134 can additionally allocate one or more additional secured buffers, such as the second secured buffer, for storing a data frame. As described, for example, payload storing component 146 can contiguously store the payload portions in a separate secured buffer as a data frame (e.g., without header portions), such as the second secured buffer, for providing to one or more applications 108. In one example, where one header portion in the stream data corresponding to a data frame is not validated, the data frame may be dropped. Moreover, in an example, driver 126 can flush the secured buffer from which the stream data was coped based on storing the stream data in the second secured buffer.

In method 300, optionally at action 314, data processing can be performed on a data frame including the contiguously stored payload portions from the second secured buffer. In an example, secured buffer storing component 132, e.g., in conjunction with processor 102, memory 104, operating system 106, etc., can perform the data processing on the data frame including the contiguously stored payload portions in the second secured buffer. For example, the data processing can correspond to one or more algorithms for editing, refining, modifying, augmenting, etc. the data frame for presenting to one or more applications. For example, where the data frame corresponds to image or video data, secured buffer storing component 132 can perform one or more image processing algorithms on the data frame to improve or alter quality of the image or video data, such as decoding, scaling, cropping, rotating, compressing/decompressing, etc. Secure buffer storing component 132 may perform substantially any sort of processing to the data frame in this regard (e.g., noise cancelling for audio data frames, feature extraction for fingerprint data frames, etc.), such that the processing may occur in the secure framework 112.

In method 300, optionally at action 316, a data frame, including the contiguously stored payload portions from the second secured buffer, can be provided to an application. In an example, secured buffer accessing component 140, e.g., in conjunction with processor 102, memory 104, operating system 106, etc., can provide, to the application 108, the data frame (e.g., data frame 502) including the contiguously stored payload portions from the second secured buffer 116, 118. For example, secured buffer accessing component 140 may provide the data frame to the application 108 based at least in part on driver 126 providing a secured buffer identifier of the second secured buffer 116,118 to the stream server 128. In this example, stream server 128 can provide the secured buffer identifier of the second secured buffer 116, 118 to the application 108. Moreover, in an example, driver 126 can flush the one or more secured buffers and/or second secured buffers 116, 118 after the data frame is provided to the application 108.

FIG. 4 is a flowchart of an example of a method 400 for storing stream data in one or more secured buffers of a secure memory. For example, method 400 can be performed by a device 100 and/or one or more components thereof to facilitate securely storing the stream data.

In method 400, at action 402, a memory descriptor list can be generated with a plurality of header portion memory locations and a plurality of payload portion memory locations. In an example, data parsing component 142, e.g., in conjunction with processor 102, memory 104, operating system 106, etc., can generate the memory descriptor list with the plurality of header portion memory locations and the plurality of payload portion memory locations. For example, the memory descriptor list may include a linked list of memory locations including alternating header portion memory locations and payload portion memory locations, where each memory location (e.g., except for a last memory location) can include a pointer to the next memory location in the list. For example, data parsing component 142 can provide the memory descriptor list to the driver 126 for storing header and payload portions of stream data.

Figure 6:
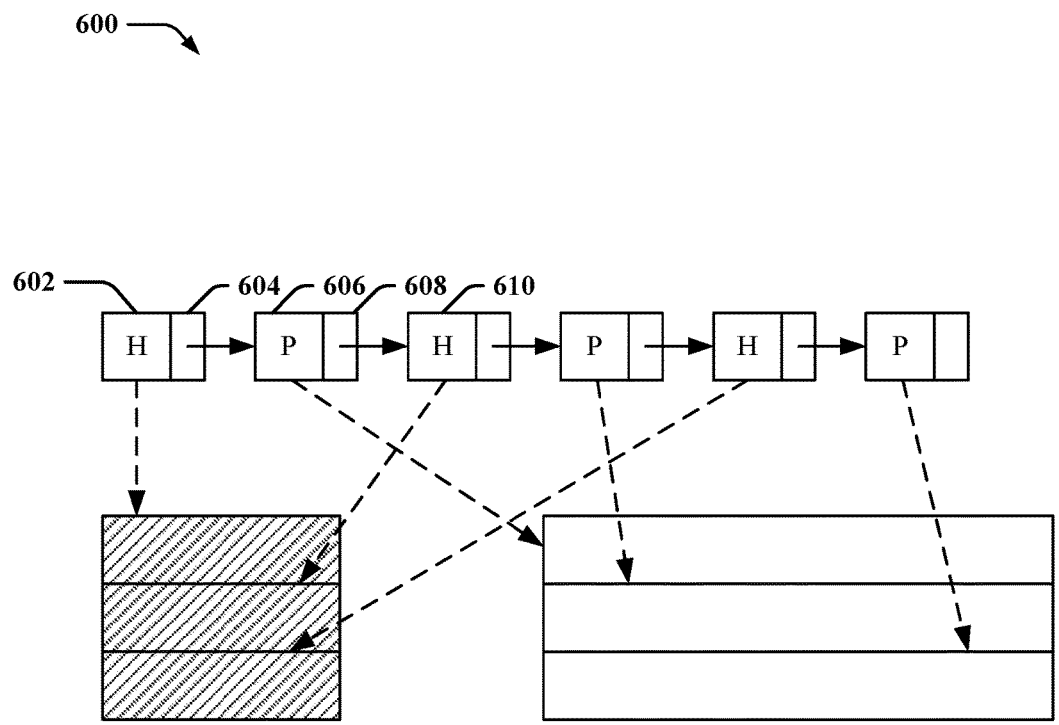
FIG. 6 is a diagram of an example of a memory descriptor list.

FIG. 6 illustrates an example of a memory descriptor list 600. Memory descriptor list 600 can include a plurality of header portion memory locations and payload portion memory locations. For example, memory descriptor list 600 can include a header portion memory location 602, which can be a memory location in non-secure or secure memory, for storing a header received with stream data from a stream source over an interface (e.g., a USB header received in an instance of stream data from a USB camera). Header portion memory location 602 may include a pointer 604 (e.g., at the end of the memory location) to a corresponding payload portion memory location 606 for storing a payload portion of the stream data that corresponds to the header portion. Payload portion memory location 606 (and other payload portion memory locations) can be within a secure memory. In addition, the payload portion memory location 606 may include a pointer 608 to a next header portion memory location 610, and so on. As described further herein, driver 126 can obtain the memory descriptor list and accordingly store the instances of stream data (e.g., the corresponding header and payload portions) in the memory location specified in the memory descriptor list 600. As shown, for example, the payload portion memory locations can be contiguous locations in the secure memory and/or header portion memory locations may be contiguous or non-contiguous portions in secure or non-secure memory. In this regard, storing the payload portions in the contiguous memory locations can generate the data frame corresponding to the multiple instances of stream data.

Referring back to FIG. 4, in method 400, at action 404, stream data can be received from the stream source. In an example, driver 126, e.g., in conjunction with processor 102, memory 104, operating system 106, etc., can receive stream data from the stream source 110. For example, driver 126 can receive the stream data in multiple portions, which may be smaller in size that a data frame corresponding to the stream source 110, and may include one or more header portions, as described.

In method 400, at action 406, a pointer to one or more of the plurality of header portion memory locations can be determined. In an example, driver 126, e.g., in conjunction with processor 102, memory 104, operating system 106, etc., can determine the pointer to the one of the plurality of header portion memory locations. For example, driver 126 can determine the pointer from the memory descriptor list as a pointer to an initial header portion memory location (e.g., header portion memory location 602) or a pointer (e.g., pointer 608) to a subsequent header portion memory location as provided in a previous payload portion memory location.

In method 400, at action 408, a header portion from the stream data can be stored in the one of the plurality of header portion memory locations. In an example, driver 126, e.g., in conjunction with processor 102, memory 104, operating system 106, etc., can store the header portion from the stream data in the one or more plurality of header portion memory locations (e.g., header portion memory location 602 or 610). In one example, driver 126 can utilize data parsing component 142 to store the header portion (e.g., header portion 504) in the header portion memory location, which may include storing the header portion in a secured or non-secured buffer, as described, based on the header portion memory location specified in the memory descriptor list.

In method 400, at action 410, a pointer to one or more of the plurality of payload portion memory locations corresponding to the header portion memory location in the memory descriptor list can be determined. In an example, secured buffer storing component 132, e.g., in conjunction with processor 102, memory 104, operating system 106, etc., can determine the pointer (e.g., pointer 604) to the one of the plurality of payload portion memory locations corresponding to the header portion memory location in the memory descriptor list. For example, driver 126 can determine the pointer indicated for the payload portion in the header portion memory location (e.g., at the end of the header portion memory location or at the end of a pointer to the header portion memory location in the memory descriptor list).

In method 400, at action 412, a payload portion from the stream data can be stored in the one of the plurality of payload portion memory locations corresponding to the pointer. In an example, secured buffer storing component 132, e.g., in conjunction with processor 102, memory 104, operating system 106, etc., can store the payload portion from the stream data in the one or more plurality of payload portion memory locations (e.g., payload portion memory location 606). In one example, driver 126 can utilize data parsing component 142 to store the payload portion (e.g., payload portion 506) in the payload portion memory location, which may include contiguously storing the payload portion with other payload portions in a secured buffer 116, 118, as described, based on the payload portion memory location specified in the memory descriptor list.

In method 400, at action 414, it can be determined whether a start of frame indicator and/or an end of frame indicator are detected in the plurality of payload portion memory locations. In an example, secured buffer storing component 132, e.g., in conjunction with processor 102, memory 104, operating system 106, etc., can determine whether a start of frame indicator and/or an end of frame indicator are detected in the plurality of payload portion memory locations (which may correspond to contiguous locations in the secured buffer 116, 118). For example, the start of frame indicator and end of frame indicator can be bits or character sequences in received stream data that respectively indicate the start of a data frame or the end of the data frame. If the start of frame or end of frame is not detected, method 400 can continue to action 404 for receiving additional stream data from the stream source until start and end of frame indicators are detected.

In method 400, optionally at action 416, data processing can be performed on a data frame including the contiguously stored payload portions from the second secured buffer. In an example, secured buffer storing component 132, e.g., in conjunction with processor 102, memory 104, operating system 106, etc., can perform the data processing on the data frame including the contiguously stored payload portions in the second secured buffer. As described above, the data processing can correspond to one or more algorithms for editing, refining, modifying, augmenting, etc. the data frame for presenting to one or more applications, such that the processing may occur in the secure framework 112.

Based on detecting start of frame and/or end of frame indicators in the plurality of payload portion memory locations, method 400 can include, at action 418, providing, to an application, a data frame including the contiguously stored payload portions from the plurality of payload portion memory locations. In an example, data parsing component 142, e.g., in conjunction with processor 102, memory 104, operating system 106, etc., can provide, to the application 108, the data frame including the contiguously stored payload portions from the plurality of payload portion memory locations. For example, secured buffer accessing component 140 may provide the data frame to the application 108 based at least in part on driver 126 providing a secured buffer identifier of the second secured buffer 116,118 to the stream server 128. In this example, stream server 128 can provide the secured buffer identifier of the secured buffer 116, 118 that stores the plurality of payload portions to the application 108. Moreover, in an example, driver 126 can flush the one or more secured buffers 116, 118 after the data frame is provided to the application 108. In this example, data parsing component 142 may not need to copy the stream data to a second secure buffer, as the secured buffer storing component 132 can contiguously store the payload portions of the stream data as received.

Figure 7:
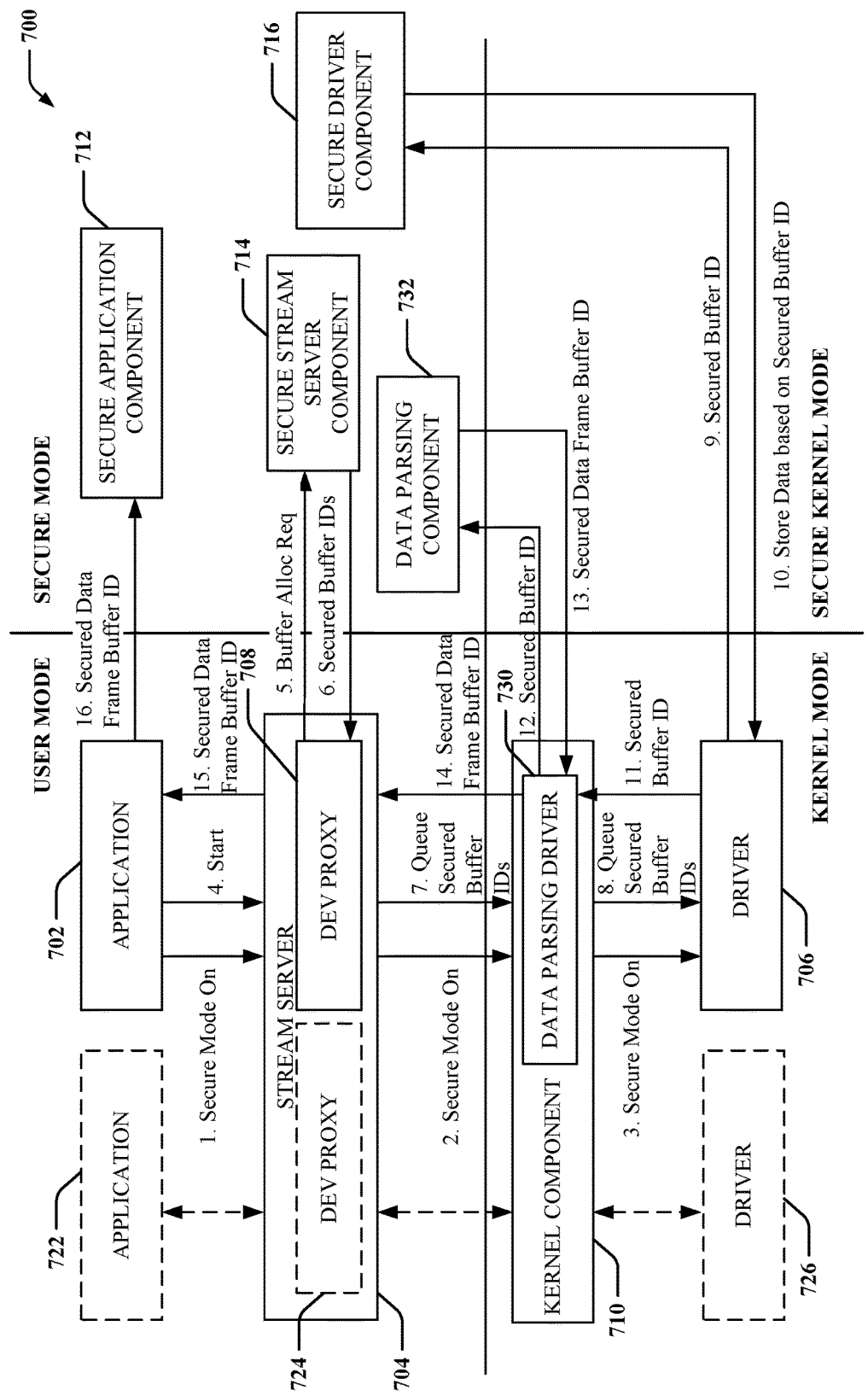
FIG. 7 is a schematic diagram of an example of a system for providing secure modes for securing stream data.

FIG. 7 illustrates an example of a system 700 (e.g., an operating system or at least a portion thereof) operating on a processor to secure stream buffers. System 700 includes an application 702, which can be similar to application 108, for requesting activation of a secure mode for securing stream data corresponding to one or more devices (e.g., a camera or other sensor device delivering framed data). System 700 also includes a stream server 704, which can be similar to stream server 128, for receiving stream data from one or more stream sources or corresponding drivers 706, and providing the stream data to, or otherwise facilitate accessing of the stream data by, application 702. Stream server 704 includes a device proxy 708 that interfaces with the driver 706 via a kernel component 710 of an operating system. In addition, kernel component 710 may include a data parsing driver 730 for parsing stream data into header and payload portions, as described above. Application 702 and stream server 704 may execute in a user mode, which may be a non-secure portion of system 700. In addition, system 700 may have a kernel mode within which driver 706 and kernel component 710 can operate.

System 700 can also have a secure mode portion including a collection of secure components, such as secure application component 712, which may be similar to secure application component 124, for allowing application 702 to communicate in the secure mode, secure stream server component 714, which may be similar to secure stream server component 122, for allowing stream server 704 to communicate in the secure mode, secure driver component 716, which may be similar to secure driver component 120, for allowing driver 706 to communicate in the secure mode, and data parsing component 732, which may be similar to data parsing component 142, for parsing stream data stored by secure driver component 716 into header and payload portions for generating a data frame without the header portions. System 700 may have a secure mode within which the secure components 712, 714, 716, 732 can operate.

In system 700, application 702 can activate secure mode by requesting activation to stream server 704 (e.g., at least for a given stream source or related device). Stream server, via device proxy 708, can request activation of secure mode to the kernel component 710, which can request activation of the secure mode to driver 706. With secure mode activated, application 702 can activate or request activation of the stream source from stream server 704. Stream server 704, via device proxy 708, can accordingly request buffer allocation to secure stream server component 714, which can allocate one or more secured buffers for storing stream data. As described, the one or more secured buffers for receiving stream data can be allocated at a size sufficient to store at least one data frame from a stream source corresponding to the driver 706 (e.g., a size of a data frame payload plus a size of a number of headers sent in multiple instances of stream data to formulate the data frame). Secure stream server component 714 can provide a collection of secured buffer identifiers to the device proxy 708. Device proxy 708 can queue the collection of secured buffer identifiers to the kernel component 710, which can queue the collection of secured buffer identifiers to the driver 706.

Based on activating the secure mode, driver 706 can store stream data in secure memory by providing one of the secured buffer identifiers to secure driver component 716 along with data to be stored in the secured buffer. Secure driver component 716 can store the data in the secured buffer, and can acknowledge storage of the data in the secured buffer corresponding to the secured buffer identifier back to the driver 706. Driver 706 can continue to store stream data, received from the stream source corresponding to driver 706, in the secured buffer. Driver 706 can accordingly provide the secured buffer identifier at which the data is stored to the kernel component 710. In an example, data parsing driver 730, via data parsing component 732, can determine whether stream data stored in the secured buffer identified by the driver 706 includes a start of frame and/or end of frame indicator. When the data parsing driver 730 determines that there is a start of frame indicator and/or an end of frame indicator in the stream data stored in the secured buffer, data parsing driver 730 can determine that the secured buffer stores a complete data frame, and can provide a secured buffer identifier to the device proxy 708.

In one example, where the secured buffer stores the data frame as multiple instances of stream data each having header portions, as described with respect to FIG. 5, when data parsing driver 730 determines the secured buffer stores a complete data frame, data parsing component 732 can copy the payload portions of the multiple instances of stream data into contiguous memory locations of a second secured buffer. For example, data parsing component 732 can validate the header portions of each instance of stream data as the payload portions are copied into the second secured buffer. Payload portions for which the header portion cannot be validated may be left out of the second secured buffer and/or the data frame can be dropped. In any case, based on copying the payload portions to the second secured buffer, data parsing driver 730 can provide an identifier of the second secured buffer to the device proxy 708. In addition, for example, device proxy 708 may store metadata from the header portions corresponding to the payload portions.

In another example, where the data parsing component 732 generates a memory descriptor list for separately storing header portions and payload portions of stream data, data parsing driver 730 can provide the identifier of the secured buffer storing the payload portions of stream data to the device proxy 708 based on detecting the start of frame and/or end of frame indicator in the stream data. Moreover, for example, data parsing component 732 may validate the headers corresponding to the header portions and stored at separate memory locations than the payload portions in determining whether to provide the identifier of the secured buffer storing the payload portions to device proxy 708 or dropping the data frame.

In any case, stream server 704 can accordingly provide the secured buffer identifier (of the second secured buffer or the secured buffer, in the respective cases described above) to the application 702, which can provide the secured buffer identifier to secure application component 712. Secure application component 712, operating in the secure mode, can access the secured buffer corresponding to the secured buffer identifier to retrieve the data stored by the driver 706. In an example, the communication of the secured buffer identifier from driver 706, to stream server 704, to application 702 can be an indication that data is available from and has been stored by the driver 706. In one example, based on accessing of the secured buffer and/or a call from the application 702, stream server 704 can flush or otherwise deallocate the secured buffer via secure stream server component 714.

In addition, for example, system 700 may optionally include an application 722, which may also request stream data from a stream source corresponding to driver 706, but may request the stream data in a non-secure mode. In this example, application 722 can request the stream data via stream server 704. Device proxy 708 can accordingly request the stream data from driver 706 via kernel component 710. In this example, driver 706 can receive stream data, and store the stream data both in secure memory via secure driver component 716, as described above, and also in non-secure memory for consumption by application 722. For example, application 722 may be a video conferencing application that may not desire secured stream data as a face authentication application may. In any case, applications 702, 722 can obtain the stream data from different sources, and driver 706 can provide the same stream data to the different sources (e.g., secure and non-secure memory).

In another example, system 700 may include an additional driver 726 for obtaining stream data from an additional device. In this example, application 702 may also request data from the additional driver 726 via stream server 704 (e.g., in a secure or non-secure mode). Device proxy 724 can communicate with driver 726 via kernel component 710 to obtain the data, a memory location of the data, a secured buffer identifier corresponding to the data, etc., as described above with respect to device proxy 708. In any case, stream server 704 can expose multiple secure or non-secure data streams to one or more applications 702, 722, and/or can contemporaneously support secure and non-secure data streams for a given driver 706, 726.

Figure 8:
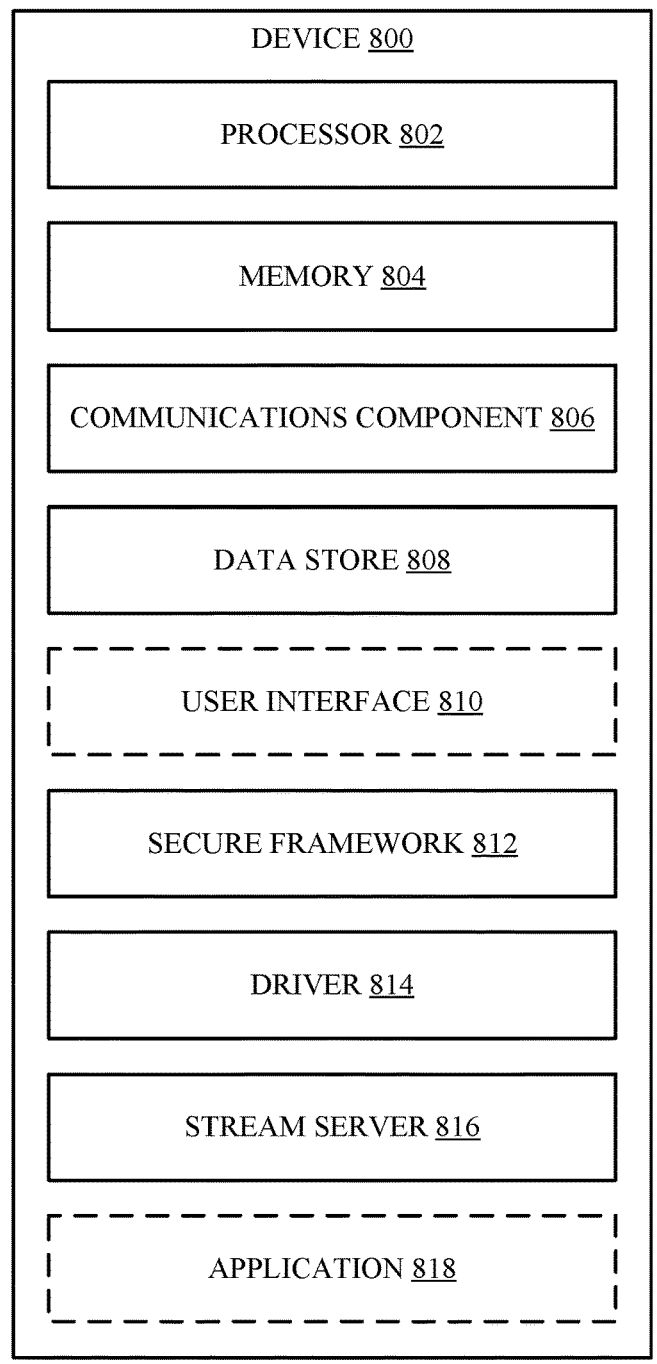
FIG. 8 is a schematic diagram of an example of a device for performing functions described herein.

FIG. 8 illustrates an example of device 800 including additional optional component details as those shown in FIG. 1. In one aspect, device 800 may include processor 802, which may be similar to processor 102 for carrying out processing functions associated with one or more of components and functions described herein. Processor 802 can include a single or multiple set of processors or multi-core processors. Moreover, processor 802 can be implemented as an integrated processing system and/or a distributed processing system.

Device 800 may further include memory 804, which may be similar to memory 104 such as for storing local versions of operating systems (or components thereof) and/or applications being executed by processor 802, such as secure framework 812, driver 814, stream server 816, application 818, etc., related instructions, parameters, etc. Memory 804 can include a type of memory usable by a computer, such as random access memory (RAM), read only memory (ROM), tapes, magnetic discs, optical discs, volatile memory, non-volatile memory, and any combination thereof.

Further, device 800 may include a communications component 806 that provides for establishing and maintaining communications with one or more other devices, parties, entities, etc. utilizing hardware, software, and services as described herein. Communications component 806 may carry communications between components on device 800, as well as between device 800 and external devices, such as devices located across a communications network and/or devices serially or locally connected to device 800. For example, communications component 806 may include one or more buses, and may further include transmit chain components and receive chain components associated with a wireless or wired transmitter and receiver, respectively, operable for interfacing with external devices.

Additionally, device 800 may include a data store 808, which can be any suitable combination of hardware and/or software, that provides for mass storage of information, databases, and programs employed in connection with aspects described herein. For example, data store 808 may be or may include a data repository for operating systems (or components thereof), applications, related parameters, etc.) not currently being executed by processor 802. In addition, data store 808 may be a data repository for secure framework 812, driver 814, stream server 816, application 818, and/or one or more other components of the device 800.

Device 800 may optionally include a user interface component 810 operable to receive inputs from a user of device 800 and further operable to generate outputs for presentation to the user. User interface component 810 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 810 may include one or more output devices, including but not limited to a display, a speaker, a haptic feedback mechanism, a printer, any other mechanism capable of presenting an output to a user, or any combination thereof.

Device 800 may additionally include a secure framework 812, which may be similar to secure framework 112, for providing a secure memory for storing and/or access data in a secure environment, a driver 814, which may be similar to driver 126, for receiving and storing stream data from one or more stream sources, a stream server 816, which may be similar to stream server 128, for obtaining, aggregating, correlating, etc. data from one or more drivers, and/or an application 818, which may be similar to application 108, for requesting secure storage of stream data as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for securely storing a payload of stream data received from a stream source, comprising:
receiving stream data from the stream source for storing in one or more secured buffers of a secure memory, wherein the stream data includes a header portion generated by a driver for the stream source and a payload portion generated from the stream source;
storing the payload portion of the stream data in the one or more secured buffers and contiguous to a previous payload portion of previous stream data received from the stream source;
storing the header portion of the stream data in another portion of the secure memory or a non-secure memory; and
providing, to an application, a data frame comprising a plurality of payload portions stored in the secure memory, wherein the plurality of payload portions include at least the payload portion of the stream data and the previous payload portion of the previous stream data.

2. The method of claim 1, further comprising:
allocating one or more additional secured buffers in the secure memory, wherein the one or more additional secured buffers are sized for receiving at least a frame of the stream data including one or more headers; and
storing multiple received instances of stream data from the stream source in the one or more additional secured buffers;
wherein storing the payload portion of the stream data comprises:
parsing payload portions from the multiple received instances of the stream data; and
contiguously storing the payload portions in the one or more secured buffers.

3. The method of claim 2, wherein parsing the payload portions is based at least in part on receiving a copy command to contiguously store the payload portions in the one or more secured buffers.

4. The method of claim 2, wherein parsing the payload portions is based at least in part on determining that the multiple received instances of the stream data comprise a complete data frame.

5. The method of claim 2, wherein storing the header portion of the stream data comprises contiguously storing header portions of the multiple received instances of the stream data in the secure memory or the non-secure memory.

6. The method of claim 1, wherein storing the payload portion of the stream data in the one or more secured buffers is based at least in part on analyzing the header portion of the stream data.

7. The method of claim 1, further comprising:
generating a memory descriptor list for storing the stream data comprising a plurality of header portion memory locations and a plurality of payload portion memory locations, wherein one or more of the header portion memory locations comprise a payload pointer to one of the plurality of payload portion memory locations, and wherein one or more of the plurality of payload portion memory locations comprise a header pointer to one of the plurality of header portion memory locations,
wherein storing the header portion of the stream data comprises storing, based on the memory descriptor list, the header portion in a header portion memory location in the plurality of header portion memory locations, and
wherein storing the payload portion of the stream data comprises storing, based on the memory descriptor list, the payload portion in a payload portion memory location in the plurality of payload portion memory locations based at least in part on identifying a pointer to the payload portion memory location specified in the header portion memory location.

8. The method of claim 7, wherein the plurality of payload portion memory locations are contiguous in the secure memory, and wherein providing the data frame to the application comprises providing, to the application, data from the plurality of payload portion memory locations.

9. The method of claim 7, wherein the plurality of payload portion memory locations are contiguous in the secure memory, and the plurality of header portion memory locations are in the non-secure memory.

10. The method of claim 1, further comprising:
receiving a request from the application to enable a secure mode for the stream source; and
allocating the one or more secured buffers in the secure memory based at least in part on enabling the secure mode.

11. The method of claim 1, further comprising:
additionally storing the stream data in the non-secure memory; and
providing, to another application, another data frame comprising payload portions of multiple instances of the stream data as stored in the non-secure memory.

12. The method of claim 1, further comprising performing data processing on the data frame to modify the data frame within the secure memory.

13. The method of claim 12, wherein the data processing includes one or more image processing algorithms.

14. The method of claim 1, wherein the stream source is a universal serial bus (USB) camera, and the driver is a USB video class driver.

15. A device for securely storing a payload of stream data received from a stream source, comprising:
a memory storing one or more parameters or instructions for executing a driver that interfaces with the stream source, wherein the memory includes a secure memory and a non-secure memory; and
at least one processor coupled to the memory, wherein the at least one processor is configured to:
receive stream data from the stream source for storing in one or more secured buffers of the secure memory, wherein the stream data includes a header portion generated by the driver for the stream source and a payload portion generated from the stream source;
store the payload portion of the stream data in the one or more secured buffers and contiguous to a previous payload portion of previous stream data received from the stream source;
store the header portion of the stream data in another portion of the secure memory or the non-secure memory; and
provide, to an application, a data frame comprising a plurality of payload portions stored in the secure memory, wherein the plurality of payload portions include at least the payload portion of the stream data and the previous payload portion of the previous stream data.

16. The device of claim 15, wherein the at least one processor is further configured to:
allocate one or more additional secured buffers in the secure memory, wherein the one or more additional secured buffers are sized for receiving at least a frame of the stream data including one or more headers; and
store multiple received instances of stream data from the stream source in the one or more additional secured buffers;
wherein the at least one processor stores the payload portion of the stream data at least in part by:
parsing payload portions from the multiple received instances of the stream data; and
contiguously storing the payload portions in the one or more secured buffers.

17. The device of claim 16, wherein the at least one processor is configured to parse the payload portions based at least in part on receiving a copy command to contiguously store the payload portions in the one or more secured buffers.

18. The device of claim 16, wherein the at least one processor is configured to parse the payload portions based at least in part on determining that the multiple received instances of the stream data comprise a complete data frame.

19. The device of claim 15, wherein the at least one processor is further configured to:
generate a memory descriptor list for storing the stream data comprising a plurality of header portion memory locations and a plurality of payload portion memory locations, wherein one or more of the header portion memory locations comprise a payload pointer to one of the plurality of payload portion memory locations, and wherein one or more of the plurality of payload portion memory locations comprise a header pointer to one of the plurality of header portion memory locations,
wherein the at least one processor is configured to store the header portion of the stream data at least in part by storing, based on the memory descriptor list, the header portion in a header portion memory location in the plurality of header portion memory locations, and
wherein the at least one processor is configured to store the payload portion of the stream data at least in part by storing, based on the memory descriptor list, the payload portion in a payload portion memory location in the plurality of payload portion memory locations based at least in part on identifying a pointer to the payload portion memory location specified in the header portion memory location.

20. A non-transitory computer-readable medium, comprising code executable by one or more processors for securely storing a payload of stream data received from a stream source, the code comprising code for:
receiving stream data from the stream source for storing in one or more secured buffers of a secure memory, wherein the stream data includes a header portion generated by a driver for the stream source and a payload portion generated from the stream source;
storing the payload portion of the stream data in the one or more secured buffers and contiguous to a previous payload portion of previous stream data received from the stream source;
storing the header portion of the stream data in another portion of the secure memory or a non-secure memory; and
providing, to an application, a data frame comprising a plurality of payload portions stored in the secure memory, wherein the plurality of payload portions include at least the payload portion of the stream data and the previous payload portion of the previous stream data.

* * * * *